O. BUCKLIN.
MANURE SPREADER.
APPLICATION FILED AUG. 31, 1918.
1,324,540.
Patented Dec. 9, 1919.
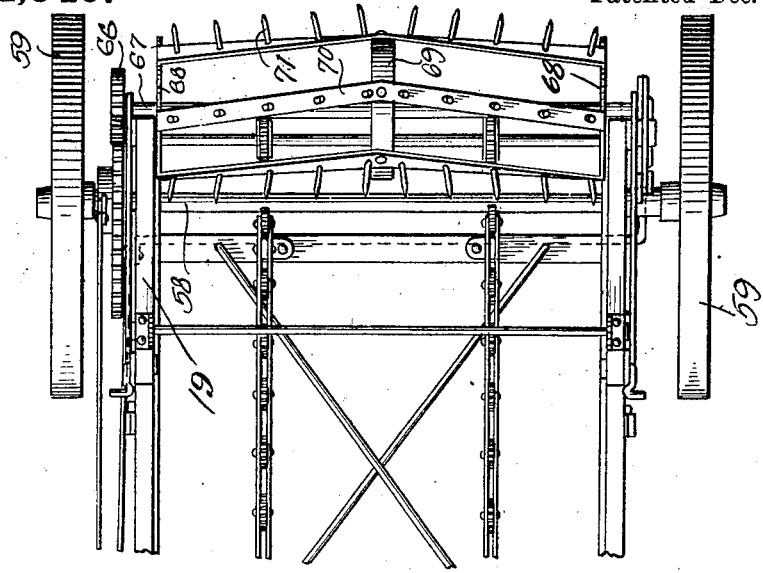
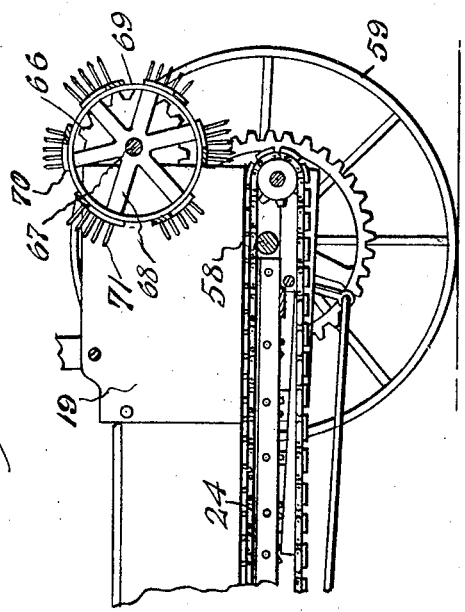
Witness
Inventor
O. Bucklin,
By C. A. Snow & Co.
Attorneys

UNITED STATES PATENT OFFICE.

ORSON BUCKLIN, OF MARIETTA, MINNESOTA.

MANURE-SPREADER.

1,324,540. Specification of Letters Patent. Patented Dec. 9, 1919.

Application filed August 31, 1918. Serial No. 252,196.

*To all whom it may concern:*

Be it known that I, ORSON BUCKLIN, a citizen of the United States, residing at Marietta, in the county of Lac qui Parle and State of Minnesota, have invented a new and useful Manure-Spreader, of which the following is a specification.

The device forming the subject matter of this application is a manure spreader, and the object of the invention is to improve the rotary member so that it will be peculiarly efficient in spreading the manure, and will operate a minimum expenditure of power.

In the accompanying drawings:—

Figure 1 shows in top plan a portion of a vehicle provided with a device constructed in accordance with the invention, the apron having been omitted; Fig. 2 is a longitudinal section of a vehicle wherein parts appear in elevation.

In carrying out the invention there is provided a vehicle frame 19 traversed by an endless apron 24.

A main axle 58 is journaled for rotation in the rear end of the frame 19. A gear train 66 connects the axle 58 with a shaft 67 journaled in the rear end of the frame 19. The shaft 67 carries a rotary spreader including end members 68 and an intermediate ring 69, connected by strips 70. Mounted on the strips 70 are teeth 71. The teeth 71 on the strips 70 are disposed in lines which converge toward an apex, the teeth on each side of this apex slanting outwardly toward the ends of the spreader. The teeth on any one strip 70 are shorter than the teeth on the next strip 70, that is the teeth of the strips are, alternately, long and short, there being in practical operation a difference of perhaps three quarters of an inch in the teeth.

In practical operation, when the vehicle moves over the surface of the ground, the wheels 59 rotate the axle 58 and the gear train 66 rotates the shaft 67, motion being transmitted to the rotary member or spreader hereinbefore described.

The upper run of the endless apron 24 may be moved rearwardly by any suitable means and the manure on the apron will be advanced within the reach of the rotary member comprising the teeth 71.

Especial attention is directed to the fact that the lines of teeth 71 on the strips 70 of the rotary spreader, converge to an apex, and slant outwardly, in opposite directions, on each side of the apex, the teeth 71 on one strip being shorter than the teeth on the next strip, this construction being carried out around the entire circumference of the rotary spreader. Owing to the construction above outlined, the spreader may be rotated with a small amount of power. The longer teeth engage the coarser portions of the manure, such as straw, and the shorter teeth engage finer portions of the manure. The rotary spreader is so constructed, that it will spread a maximum width with a minimum expenditure of power, this result arising out of the specific arrangement of the teeth 71.

Having thus described the invention, what is claimed is:—

In a manure spreader, a cylindrical rotary member having a straight axis and carrying longitudinal lines of peripheral teeth, each line comprising parts which converge circumferentially of the rotary member to form an apex disposed intermediate the ends of the rotary member, the teeth in the respective parts of each line slanting in opposite directions toward the ends of the rotary member, the teeth of alternate lines being shorter than the teeth of the other lines.

In testimony that I claim the foregoing as my own, I have hereto affixed my signature in the presence of two witnesses.

ORSON BUCKLIN.

Witnesses:
J. G. NASETH,
OSCAR J. LARSON.